United States Patent [19]

Shibasaki et al.

[11] Patent Number: 5,686,958

[45] Date of Patent: Nov. 11, 1997

[54] ELECTRONIC ENDOSCOPE APPARATUS WITH NOISE SUPPRESSION CIRCUIT

[75] Inventors: Tetsuya Shibasaki, Kodaira; Fujio Okada; Nobuyuki Akai, both of Omiya, all of Japan

[73] Assignees: Hitachi Denshi Kabushiki Kaisha, Tokyo; Fuji Photo Optical Co., Ltd., Omiya, both of Japan

[21] Appl. No.: 536,265

[22] Filed: Sep. 29, 1995

[30] Foreign Application Priority Data

Sep. 30, 1994 [JP] Japan .................................. 06-236141

[51] Int. Cl.$^6$ ...................................................... H04N 5/21
[52] U.S. Cl. ........................... 348/70; 348/65; 348/45
[58] Field of Search ........................ 348/65, 66, 67, 348/68, 69, 70–76, 223, 641–655, 45; 600/104

[56] References Cited

U.S. PATENT DOCUMENTS

| | | | |
|---|---|---|---|
| 4,615,330 | 10/1986 | Nagasaki et al. | 600/104 |
| 4,633,303 | 12/1986 | Nagasaki et al. | 348/65 |
| 4,768,515 | 9/1988 | Namekawa | 348/29 |
| 4,819,077 | 4/1989 | Kikuchi et al. | 348/71 |
| 4,933,757 | 6/1990 | Kanno et al. | 348/71 |
| 4,933,758 | 6/1990 | Saito et al. | 348/71 |
| 5,111,281 | 5/1992 | Sekiguchi | 348/71 |
| 5,111,804 | 5/1992 | Funakoshi | 348/71 |
| 5,254,977 | 10/1993 | MacDonald | 348/29 |
| 5,282,030 | 1/1994 | Nishimura et al. | 348/29 |
| 5,550,582 | 8/1996 | Takasugi et al. | 348/29 |

FOREIGN PATENT DOCUMENTS

A-4-354272  8/1992  Japan .................................. H04N 5/21

*Primary Examiner*—Tommy P. Chin
*Assistant Examiner*—Vu Le
*Attorney, Agent, or Firm*—Antonelli, Terry, Stout & Kraus, LLP

[57] ABSTRACT

An electronic endoscope apparatus has an illumination unit for irradiating light of red, light of green and light of blue on an object for photographing in predetermined order at a predetermined period; an image signal generation unit for receiving reflection light from the object, generating a field sequential image signal on the basis of the received reflection light and delivering the field sequential digital image signal; a first memory unit for forming a predetermined look up table; a red data memory unit for storing data of a red image signal by one field; a green data memory unit for storing data of a green image signal by one field; a blue data memory unit for storing data of a blue image signal by one field, one field from the first memory unit being stored in one of the data memory unit for red, green and blue in synchronism with the order and the predetermined period of color illumination by the illumination unit; a switching unit for reading data from one of said data memory unit in synchronism with the order and the period of color illumination by the illumination unit and supplying the data as an addressing data to the first memory unit; and a unit for reading data pieces representative of the red, green and blue image signals from the data memory units and synthesizing the data pieces to produce a color image signal.

6 Claims, 5 Drawing Sheets

(HEXADECIMAL)

| Upper Address M \ Lower Address A (Field Sequential Image Data) | 00 | 01 | 02 | 03 | 04 | 05 | 06 | 07 | 08 | 09 | 0A | 0B | 0C | 0D | 0E | 0F | 10 | 11 | ... | ... | FF |
|---|---|---|---|---|---|---|---|---|---|---|---|---|---|---|---|---|---|---|---|---|---|
| 00 | 00 | 01 | 01 | 02 | 02 | 03 | 04 | 06 | 07 | 09 | 0A | 0B | 0C | 0D | 0E | 0F | 10 | 11 | | | FF |
| 01 | 01 | 01 | 02 | 02 | 03 | 03 | 04 | 05 | 07 | 08 | 0A | 0B | 0C | 0D | 0E | 0F | 10 | 11 | | | FF |
| 02 | 01 | 02 | 02 | 03 | 03 | 04 | 04 | 05 | 06 | 08 | 09 | 0B | 0C | 0D | 0E | 0F | 10 | 11 | | | FF |
| 03 | 02 | 02 | 03 | 03 | 04 | 04 | 05 | 05 | 06 | 07 | 09 | 0A | 0C | 0D | 0E | 0F | 10 | 11 | | | FF |
| 04 | 02 | 03 | 03 | 04 | 04 | 05 | 05 | 06 | 06 | 07 | 08 | 0A | 0B | 0D | 0E | 0F | 10 | 11 | | | FF |
| 05 | 03 | 03 | 04 | 04 | 05 | 05 | 06 | 06 | 07 | 07 | 08 | 09 | 0B | 0C | 0E | 0F | 10 | 11 | | | FF |
| 06 | 02 | 04 | 04 | 05 | 05 | 06 | 06 | 07 | 07 | 08 | 08 | 09 | 0A | 0C | 0D | 0F | 10 | 11 | | | FF |
| 07 | 02 | 03 | 05 | 05 | 06 | 06 | 07 | 07 | 08 | 08 | 09 | 09 | 0A | 0B | 0D | 0E | 10 | 11 | | | FF |
| 08 | 01 | 03 | 04 | 06 | 06 | 07 | 07 | 08 | 08 | 09 | 09 | 0A | 0A | 0B | 0C | 0E | 10 | 11 | | | FF |
| 09 | 01 | 02 | 04 | 05 | 07 | 07 | 08 | 08 | 09 | 09 | 0A | 0A | 0B | 0B | 0C | 0D | 10 | 11 | | | FF |
| 0A | 00 | 02 | 03 | 05 | 06 | 08 | 08 | 09 | 09 | 0A | 0A | 0B | 0B | 0C | 0C | 0D | 10 | 11 | | | FF |
| 0B | 00 | 01 | 03 | 04 | 06 | 07 | 09 | 09 | 0A | 0A | 0B | 0B | 0C | 0C | 0D | 0D | 10 | 11 | | | FF |
| 0C | 00 | 01 | 02 | 04 | 05 | 07 | 08 | 0A | 0A | 0B | 0B | 0C | 0C | 0D | 0D | 0E | 10 | 11 | | | FF |
| 0D | 00 | 01 | 02 | 03 | 05 | 06 | 08 | 09 | 0B | 0B | 0C | 0C | 0D | 0D | 0E | 0E | 10 | 11 | | | FF |
| 0E | 00 | 01 | 02 | 03 | 04 | 06 | 07 | 09 | 0A | 0C | 0C | 0D | 0D | 0E | 0E | 0F | 10 | 11 | | | FF |
| 0F | 00 | 01 | 02 | 03 | 04 | 06 | 07 | 08 | 0A | 0B | 0D | 0D | 0E | 0E | 0F | 0F | 10 | 11 | | | FF |
| 10 | 00 | 01 | 02 | 03 | 04 | 05 | 06 | 08 | 09 | 0B | 0C | 0E | 0E | 0F | 0F | 10 | 10 | 11 | | | FF |
| 11 | 00 | 01 | 02 | 03 | 04 | 05 | 06 | 07 | 09 | 0A | 0C | 0D | 0F | 0F | 10 | 10 | 10 | 11 | | | FF |
| 12 | 00 | 01 | 02 | 03 | 04 | 05 | 06 | 07 | 08 | 0A | 0B | 0D | 0E | 10 | 10 | 11 | 10 | 11 | | | FF |
| 13 | 00 | 01 | 02 | 03 | 04 | 05 | 06 | 07 | 08 | 09 | 0B | 0C | 0E | 0F | 11 | 11 | 10 | 11 | | | FF |
| 14 | 00 | 01 | 02 | 03 | 04 | 05 | 06 | 07 | 08 | 09 | 0A | 0C | 0D | 0F | 10 | 12 | 10 | 11 | | | FF |
| 15 | 00 | 01 | 02 | 03 | 04 | 05 | 06 | 07 | 08 | 09 | 0A | 0B | 0D | 0E | 10 | 11 | 10 | 11 | | | FF |
| 16 | 00 | 01 | 02 | 03 | 04 | 05 | 06 | 07 | 08 | 09 | 0A | 0B | 0C | 0E | 0F | 11 | 10 | 11 | | | FF |
| 17 | 00 | 01 | 02 | 03 | 04 | 05 | 06 | 07 | 08 | 09 | 0A | 0B | 0C | 0D | 0F | 10 | 10 | 11 | | | FF |
| 18 | 00 | 01 | 02 | 03 | 04 | 05 | 06 | 07 | 08 | 09 | 0A | 0B | 0C | 0D | 0E | 10 | 10 | 11 | | | FF |
| 19 | 00 | 01 | 02 | 03 | 04 | 05 | 06 | 07 | 08 | 09 | 0A | 0B | 0C | 0D | 0E | 0F | 10 | 11 | | | FF |
| | | | | | | | | | | | | | | | | | | | | | |
| | | | | | | | | | | | | | | | | | | | | | |
| | | | | | | | | | | | | | | | | | | | | | |
| FF | 00 | 01 | 02 | 03 | 04 | 05 | 06 | 07 | 08 | 09 | 0A | 0B | 0C | 0D | 0E | 0F | 10 | 11 | | | FF |

$A \geq 16$
$k = 0$

ELECTRONIC ENDOSCOPE APPARATUS WITH NOISE SUPPRESSION CIRCUIT

BACKGROUND OF THE INVENTION

The present invention relates to electronic endoscope apparatus for observing pictures of organ images such as the walls of the stomach or intestines being visualized with a color monitor television and more particularly, to an electronic endoscope apparatus which can suppress noise generated in an image signal to produce an image of high quality.

Available as one of imaging schemes for the color television camera is a field sequential scheme. According to this scheme, signals of three primary colors Red, Green and Blue (R, G, B) are sequentially generated using a single imaging device, for example, a CCD. An object for photographing is irradiated with illumination light of, for example, red and reflection light of red from the object is received by the single CCD. During this light reception, the CCD is scanned by one field to produce an R signal. Subsequently, the object is irradiated with illumination light of green and reflection light of green from the object is received by the same CCD. During this light reception, the CCD is scanned by one field to produce a G signal. Thereafter, reflection light from the object now irradiated with illumination light of blue is received by the same CCD while the CCD being scanned by one field, thereby producing a B signal. Accordingly, R, G and B signals for one frame can be obtained through three scanning operations. The R, G and B signals of three fields obtained through the three scanning operations are synthesized to produce one color image.

The field sequential scheme as above can permit the single imaging device (CCD) to produce a color image, having an advantage of reducing the size of the optical system. Such imaging system is suitable for use in the endoscope apparatus which is inserted into a very narrow cavity of organ for organ imaging.

Figure 2:
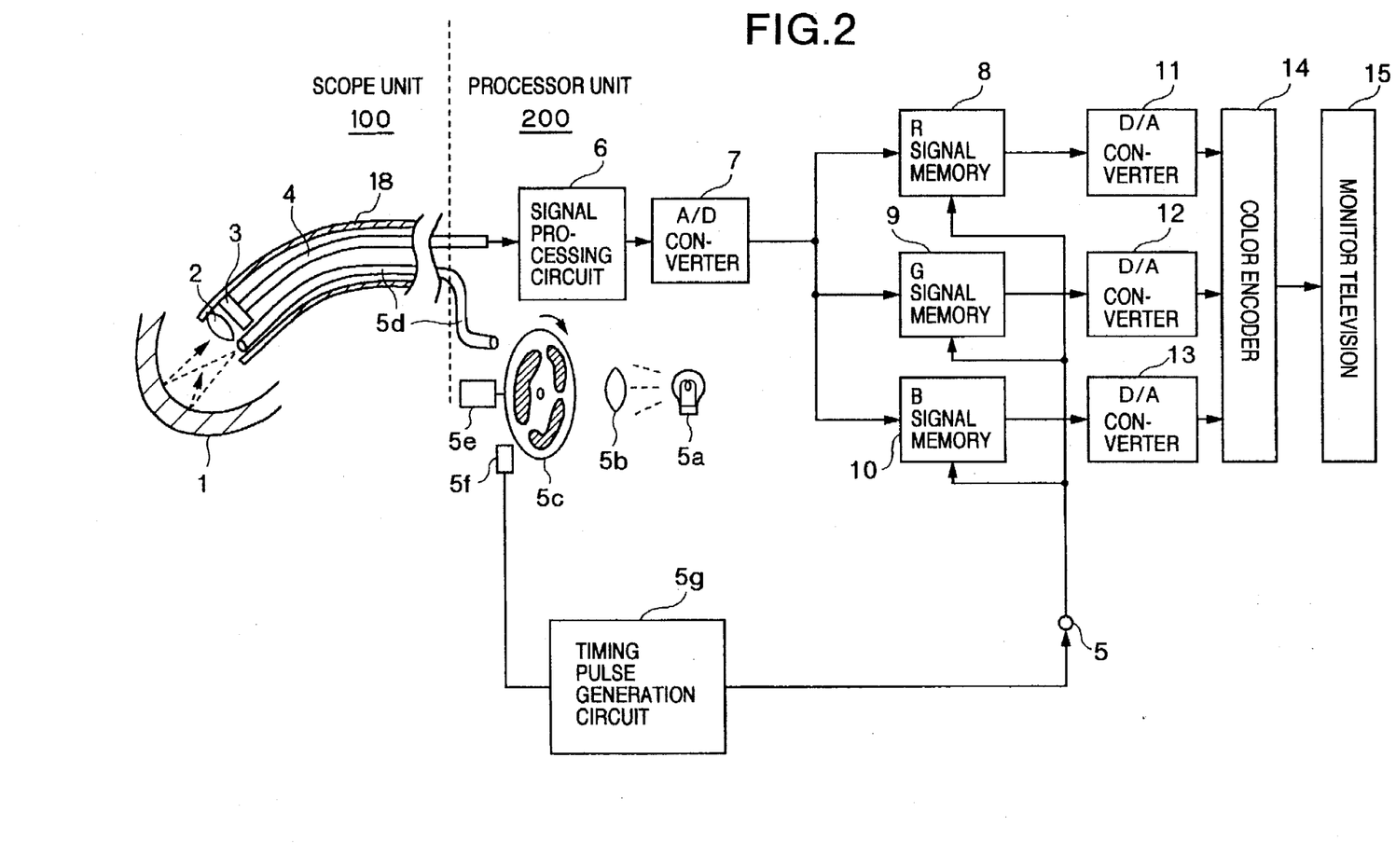
FIG. 2 is a block diagram showing the overall construction of a conventional, general electronic endoscope apparatus.

Referring now to FIG. 2, construction and operation of a conventional, general electronic endoscope apparatus will be described. As shown in FIG. 2, the electronic endoscope apparatus includes a scope unit for picking up of an image of object such as an organ, and a processor unit (including a light source) for processing image signals being picked up. The electronic endoscope is generally formed with a scope unit 100 and a processor unit 200. FIG. 2 shows an enlarged sectional view of the head portion of the scope unit 100, and a block diagram of the processor unit 200. The scope unit 100 includes a lens 2, a CCD 3, a signal cable 4 connecting the output of the CCD 3 with the processor unit 200 and a light guide 5d transferring illumination light, and an outer tube 18. The scope unit 100 is flexible and easily bend. The scope unit 100 and the processor unit 200 may be connected to each other with a connecting member (not shown). The processor unit 200 includes a signal circuit portion for processing the image signals and an illumination unit as described in detail in the following description. White light from a light source 5a is collected by a lens 5b and passes through a rotary filter 5c so as to be led to one end of a light guide 5d. The rotary filter 5c has a rotary disk and color filters of red, green and blue are arranged at the periphery of the rotary disk at equiangular intervals (120°). The rotary filter 5c is rotated by a motor 5e at a speed of a constant revolution number of, for example, 20 revolutions per second. Accordingly, light going out of the tip of the light guide 5d changes in color every 1/60 seconds to exhibit red, green and blue.

Light of red going out of the tip of the light guide 5d irradiates the surface of an object 1 for photographing. An imaging lens 2 makes an image of reflection light from the object 1 on the surface of a CCD 3 (Charge-Coupled Device image sensor). The incident light is subjected to photoelectric conversion by means of the CCD 3. While the CCD 3 is scanned for a time of one field (1/60 seconds), an R signal standing for an image signal of red is produced. Subsequently, illumination light changes in color to green and a G (green) signal for one field can be produced during a period of 1/60 seconds in a similar way. Further, illumination light changes from green to blue and a B (blue) signal can be produced similarly. By repeating the above operation, field sequential R, G and B analog signals can be obtained sequentially. The R, G and B signals are sequentially sent to a signal processing circuit 6 through a cable 4.

The signal processing circuit 6 performs the analog signal processing including amplification of signals, γ correction and removal of unwanted signals. An A/D converter 7 converts the R, G and B analog signals into digital signals. The field sequential R, G and B digital signals are written into a field memory 8 for R signal, a field memory 9 for G signal and a field memory 10 for B signal, respectively. Write operation of the R, G and B digital signals into the field memories is carried out in synchronism with a timing pulse 5 serving as a synchronizing pulse delivered out of a pulse generation circuit 5g for field selection. The pulse generation circuit 5g for field selection generates the timing pulse 5 which corresponds to an irradiation period (1/60 seconds) of illumination light of each color produced from a color filter position detector 5f. More particularly, during the period in which light passing through the rotary filter 5c exhibits red, an R signal is delivered out of the A/D converter 7 and therefore, the timing pulse 5 controls the output of A/D converter 7 to cause it to be written into the field memory 8 for R signal. Subsequently, a G signal and a B signal are similarly written into the field memory 9 for G signal and the field memory 10 for B signal, respectively.

Figure 3:
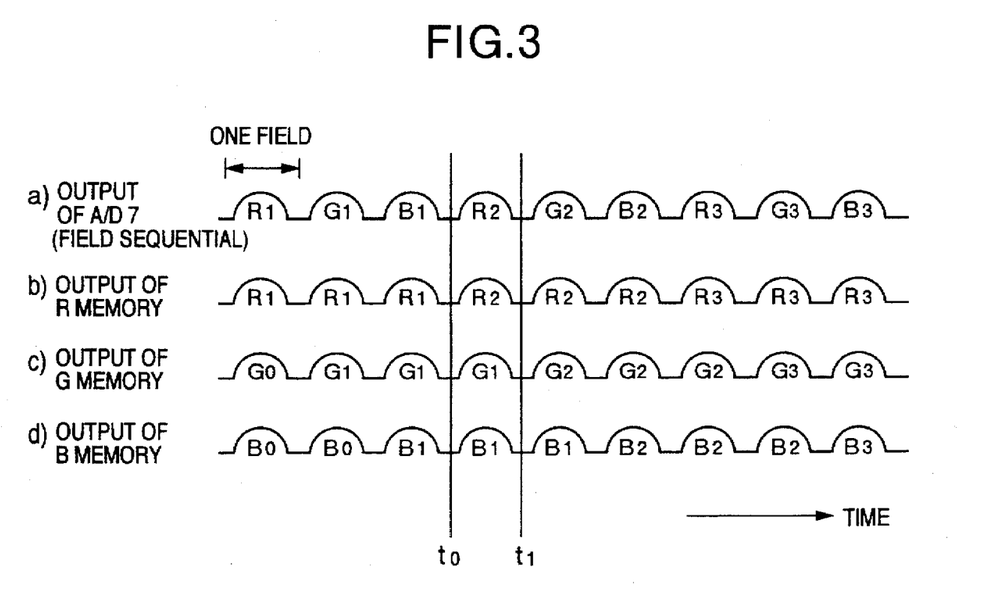
FIG. 3 is a timing chart of signals useful to explain write/read operation of data to/from the field memory.

The R, G and B signals, each for one field, written into the field memories 8, 9 and 10 are read simultaneously and inputted to D/A converters 11, 12 and 13 so as to be converted into analog R, G and B signals. FIG. 3 is a timing chart showing at a), b), c) and d), respectively, signals representing the output of the A/D converter 7, the output of the R field memory 8, the output of the G field memory 9 and the output of the B field memory 10. Waveforms in a semicircular form in the figure schematically indicate the R, G and B signals. Numerals affixed to the side of the respective R, G and B indicate the order of field scanning, with a younger numeral indicating an older field. Namely, in terms of R signals, a signal obtained through the oldest scanning is represented by R0 and a signal obtained through the latest scanning is represented by R3.

As will be seen from the timing chart of FIG. 3, the output signal from the A/D converter 7 is once written into each of the field memories 8, 9 and 10. Then, the same R signal, the same G signal and the same B signal are respectively read three times repetitively from the respective field memories 8, 9 and 10. Accordingly, during a time interval between t0 and t1, R2, G1 and B1 signals are inputted at a time to the D/A converters 11, 12 and 13, respectively. Analog R, G and B signals delivered out of the D/A converters 11, 12 and 13 are synthesized to a color signal by means of a color encoder 14 and an image is displayed on a monitor television 15.

In the electronic endoscopes utilizing above field sequential imaging method, various measures are taken for improving the picture quality. One of these measures is suppressing or reducing of noise components.

Figure 4:
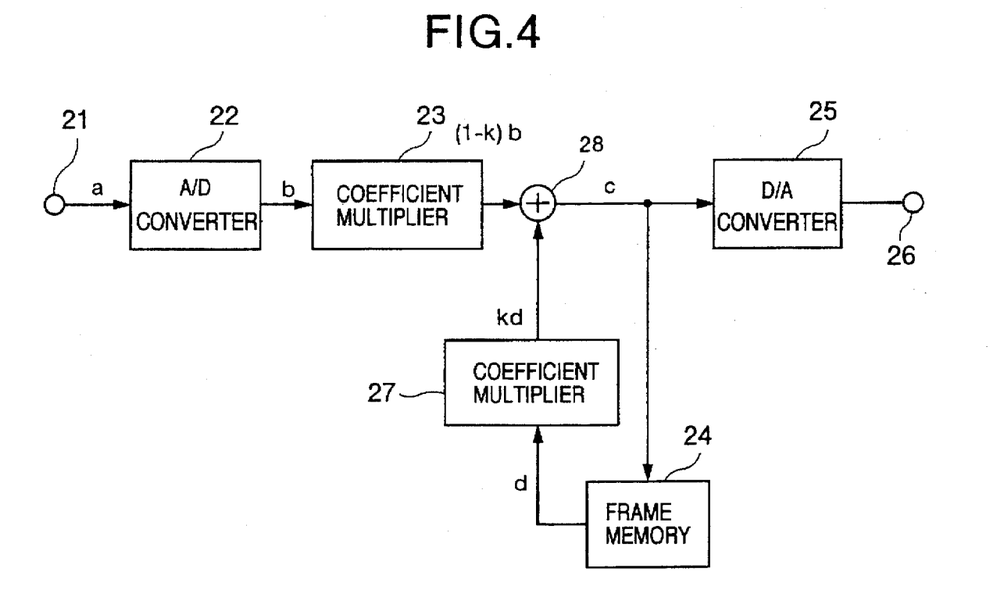
FIG. 4 is a circuit diagram of an example of a noise suppression apparatus for an image signal.

An apparatus for suppression or reduction of noise in image signals based on a method utilizing interframe correlation has been known in a conventional imaging apparatus. Correlation between frames is strong in image signals but the interframe correlation is nonexistent or less for noise components. By averaging signals indicative of adjacent frames, noise components can be suppressed. A circuit of FIG. 4 is an example of a noise suppression apparatus utilizing the interframe correlation, illustrating a recursive type circuit using a frame memory. The operation of the noise suppression apparatus will be described by way of one color signal channel.

An image signal $a$ applied to an input terminal 21 is converted by an A/D converter 22 into image data $b$. This digital image data $b$ is multiplied by 1−k (k being a coefficient which is smaller in absolute value than 1) by means of a coefficient multiplier 23 and is then applied to an adder 28. On the other hand, output data $d$ of a frame memory 24 is multiplied by k by means of a coefficient multiplier 27 and thereafter applied to the adder 28 to produce an output $c$ which is (1−k)b+kd. The output $c$ of the adder 28 is again inputted to the frame memory 24 and at the same time supplied to a D/A converter 25 so as to be returned to an analog signal which is delivered through an output terminal 26.

When the value of k is herein assumed to be 0.5, the above equation becomes (b+d)/2, indicating that image data pieces which are correlated to each other can be averaged and noise components which are not correlated to each other can be suppressed.

With the above construction, the noise suppression can be effected but when an object moves fast and the correlation between image data pieces $b$ and $d$ is weak or nonexistent (in the case of a moving image), an output which does not follow a change in an input is added in a large amount to increase an afterimage, so that a considerable deterioration in image quality occurs in a moving image portion.

Figure 5:
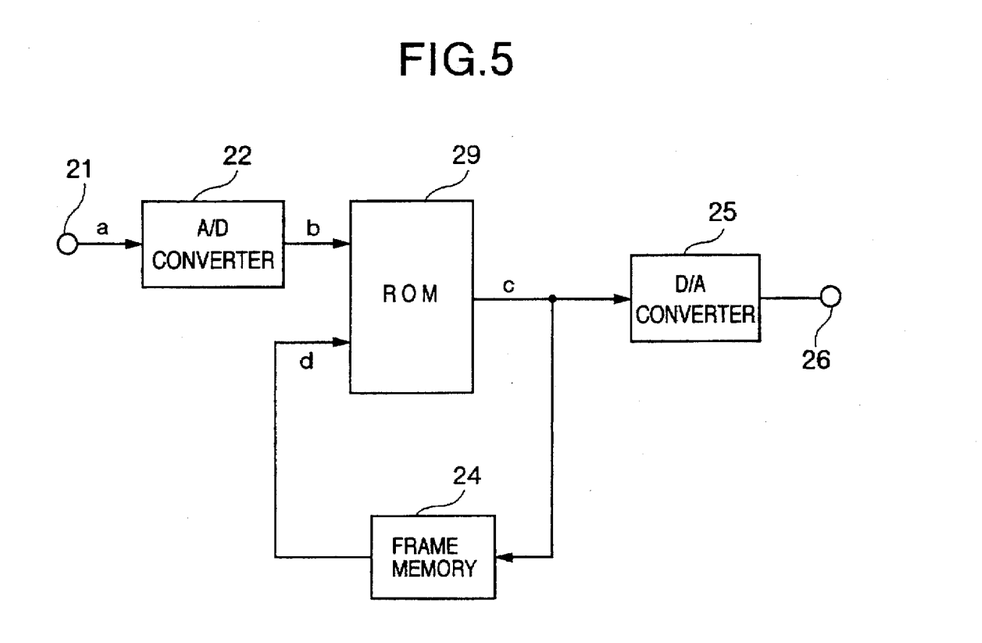
FIG. 5 is a circuit diagram of another example of a noise suppression apparatus for an image signal.

As effective countermeasures against this problem, a scheme described in Japanese Patent Application Un-examined Publication No. JP-A-4-354272 and illustrated in FIG. 5 in the accompanying drawings can be employed. In the scheme of FIG. 5, there are provided a frame memory 24 for storing digitized image signals $a$ in a unit of frame and a read only memory (ROM) 29. Image data $b$ of an image signal $a$ is supplied as lower addressing data to a lower address input of the ROM 29 while output image data $d$ of the frame memory 24 being supplied as upper addressing data to an upper address input, and output image data $c$ of the ROM 29 is inputted to the frame memory 24 and is also used as an output of the whole of the apparatus. A look up table storing output data $c$ corresponding to each address designated by addressing inputs $b$ and $d$ is formed in the ROM 29. When a set of address values $b$ and $d$ are applied as addressing data to the ROM 29, an output value $c$ stored at a designated address is read and delivered. The input/output relation between the address and the output is assumed to be c=b−k(b−d)=(1−k)b+kd, where k is a coefficient which is less than 1 in absolute value. Structurally, k=0 stands when the absolute value of b−d exceeds a predetermined value. More specifically, answers to a correction value k(b−d) for the (b−d) value are tabulated and data pieces corresponding to answers to b−k(b−d) are set at designated corresponding addresses of ROM 29 by addressing data corresponding to sets of input image data pieces $b$ and $d$.

With this construction, when image data pieces $b$ and $d$ are inputted for which b−d is not greater than the predetermined value in absolute value to indicate that the interframe correlation between the data pieces is strong (in the case of a still image portion), the image data pieces $b$ and $d$ correlated to each other can be averaged in accordance with the above equation and noise components having no correlation therebetween can be suppressed. On the other hand, when image data pieces $b$ and $d$ are inputted for which b−d exceeds the predetermined value in absolute value to indicate that the interframe correlation between the data pieces is weak (in the case of a moving image portion), k=0 stands and the image data piece $b$ is directly delivered without being accompanied by any afterimage. For k=0, the afterimage can be eliminated but the noise suppression effect cannot be attained. Noise components, however, are less eminent and influential in the case of a moving image than in the case of a still image. In other words, in the case of a moving image, the afterimage reduction effect is more meritorious than the noise suppression effect.

SUMMARY OF THE INVENTION

The present inventors have found various problems as below encountered in applying the noise suppression apparatus as shown in FIG. 4 or 5 to the electronic endoscope apparatus of FIG. 2.

As has already been described, in the electronic endoscope based on the field sequential scheme, a color image of one frame can be obtained every three fields alone. This means that the required time is three times the time required in the other imaging schemes. In the case of the electronic endoscope, it is very frequent that either one or both of an object for photographing (for example, a living body organ) and the endoscope move within a relatively long interval of time (1/20 seconds) for three fields (one frame). With the noise suppression apparatus of FIG. 4 applied to the electronic endoscope apparatus of FIG. 2, the interfield (or interframe) correlation is considerably decreased to degrade the image quality when relative movement occurs between an object and the endoscope. With the noise suppression apparatus of FIG. 5 applied to the electronic endoscope of FIG. 2, a deterioration in image quality due to an afterimage can be suppressed but the noise suppression apparatus of FIG. 5 must be provided for each of the R, G and B color signals, with the result that not only the circuit scale grows but also consumptive power is increased.

An object of the present invention is to provide an electronic endoscope apparatus which can eliminate the aforementioned problems and can attain the noise suppression effect highly effectively with a simplified circuit configuration.

According to the present invention, an electronic endoscope apparatus comprises an illumination unit for irradiating light of red, light of green and light of blue on an object for photographing in predetermined order at a predetermined period; an image signal generation unit for receiving reflection light from the object, generating a field sequential digital image signal on the basis of the received reflection light and delivering the field sequential digital image signal; a first memory unit for forming a look up table; a red data memory unit for storing data of a red image signal by one field (or frame); a green data memory unit for storing data of a green image signal by one field (or frame); a blue data memory unit for storing data of a blue image signal by one field (or frame), data of one field (or frame) from the first memory unit being stored in one of said three memory units in synchronism with the order and the predetermined period of color illumination by the illumination unit; a switching unit for reading data from one of said data memory units in synchronism with the order and the period of color illumination by the illumination unit and supplying the data as an addressing data of the first memory unit; and a unit for reading data pieces representative of the red, green and blue image signals from either one of said data memory units and synthesizing the data pieces to produce a color image signal, the first memory unit being operable to receive as an addressing data the output of the image signal generation unit and the output of the switching unit and respond to designation by the addressing data to deliver given data stored at a designated address on the look up table.

As a result, when relative movement between the object and the electronic endoscope is small and the difference between the field sequential image data and the output image data read out of each data memory unit for each color is not greater than the predetermined value (in the case of a still image), output data whose noise components are suppressed can be produced from the first memory and is in turn applied to the corresponding data memory unit for each color. When relative movement between the object and the output image data read out of each data memory unit for each color exceeds the predetermined value (in the case of a moving image), data delivered out of the first memory unit forming the look up table becomes image data without any afterimage which in turn is applied to the corresponding data memory unit for each color. Accordingly, a single ROM suffices and noise suppression leading to high image quality can be ensured with a simplified circuit configuration. Further, by changing only the contents of the look up table of the first memory unit, an electronic endoscope apparatus having noise suppression characteristics which are optimum for input signals can be constructed easily.

Other objects and effects of the present invention can be understood by reading the following description thereof in conjunction with the accompanying drawings.

BRIEF DESCRIPTION OF THE DRAWINGS

FIG. 6 shows an embodiment of a look up table used in the electronic endoscope apparatus of the present invention.

DESCRIPTION OF THE PREFERRED EMBODIMENTS

Figure 1:
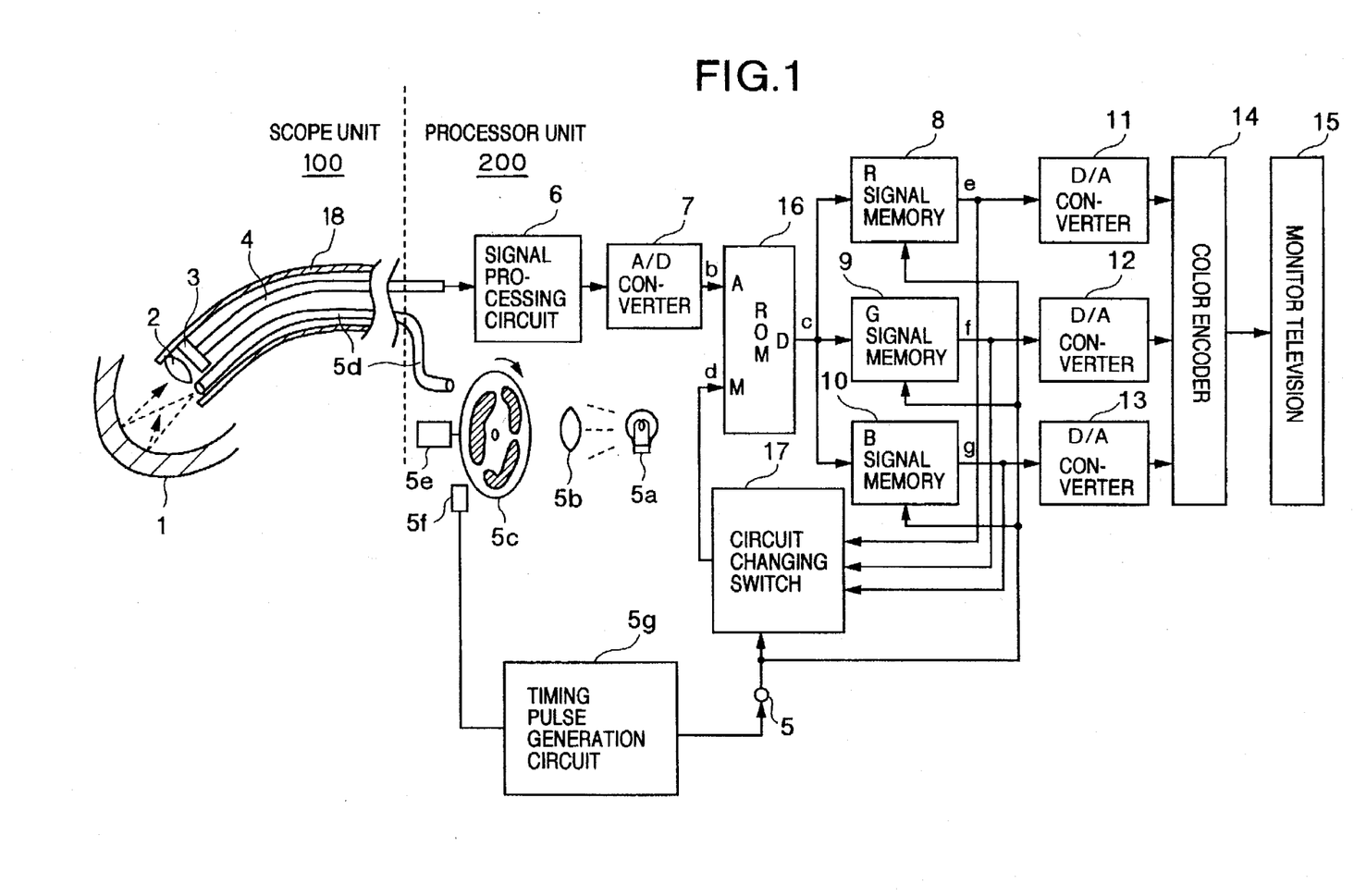
FIG. 1 is a block diagram showing the overall construction of an electronic endoscope apparatus according to the present invention.

An embodiment of the present invention will now be described with reference to FIG. 1 by highlighting a noise suppression portion. Components identical to those of FIG. 2 are designated by identical reference numerals and will not be described herein.

Used herein as an image memory (LUT memory) 16 constituting a look up table to be described later is a read only memory (ROM). A circuit changing switch 17 responds to the previously-described timing pulse 5 to cause each of the R signal memory 8, G signal memory 9 and B signal memory 10 to be switched so as to deliver an output at a timing of (in phase synchronization with) delivery of each of the field sequential digital image signals (hereinafter referred to as image data) b from the A/D converter 7.

The circuit changing switch 17 is comprised of a buffer memory (not shown) for holding respective outputs of the R signal memory 8, G signal memory 9 and B signal memory 10 and a gate circuit (not shown) for controlling the output operation of the buffer memory. Data temporarily stored in the buffer memory of the circuit changing switch 17 is applied as an addressing data to an address input M of the ROM 16 under the direction of the timing pulse 5. For example, when the rotary filter 5c is positioned for illumination of red, the circuit changing switch 17 supplies data of the R signal memory 8 as an addressing data to the address input M of the ROM 16. In other words, the phase synchronization is set up by the timing pulse 5 such that a signal (for indication of an addressing data) picked up and applied to an address input A of ROM 16 and a signal (for indication of an address) delivered out of one of the field memories 8, 9 and 10 and applied to the address input M of the ROM 16 are of the same color signal and of the same signal period.

With the above construction, field sequential image data pieces $\underline{b}$ for R, G and B delivered out of the A/D converter 7 are applied as the lower addressing data to an address input of the ROM 16 and output data pieces $\underline{d}$, which are in phase synchronization with the image data pieces $\underline{b}$, delivered out of the respective R, G and B color signal memories and switched by the circuit changing switch 17, are applied as the upper addressing data to an address input of the ROM 16. Field sequential output data pieces $\underline{c}$ corrected in the ROM 16 as will be described later are applied to corresponding R signal memory 8, G signal memory 9 and B signal memory 10 under the direction of the previously-described timing pulse 5. The ROM 16, R, G and B signal memories 8, 9 and 10 and circuit changing switch 17 carry out a same operation as above mentioned recursive type filter.

Output data pieces $\underline{e}$, $\underline{f}$ and $\underline{g}$ for R, G and B read out of the R, G and B signal memories 8, 9 and 10 simultaneously are converted into analog image signals by the D/A converters 11, 12 and 13, respectively, synthesized by the color encoder 14 and led to the monitor television 15 so as to provide an image display.

The operation of noise suppression according to the present invention will further be described.

As an example, image data to be handled is of 8 bits and an EPROM of 512 Kbits (64 Kbits×8 bits) having 16 address inputs is used as the ROM 16.

Here, when 8-bit image data $\underline{b}$ of the A/D converter 7 to be inputted as lower addressing data to eight lower address inputs of the ROM 16 is A, 8-bit output data $\underline{d}$ to be switched by the circuit changing switch 17 and delivered out thereof so as to be applied as upper addressing data to the rest of eight upper address inputs is M and output image data $\underline{c}$ of the ROM 16 is D, the contents of the ROM 16 constituting the look up table is set such that the input/output relation of the ROM 16 satisfies the following equation (1):

$$D = A - k(A-M) \text{ where for } |A-M|<x \text{ (predetermined value)}, 0 \leq k \leq 1 \text{ for } |A-M| \geq x \text{ (predetermined value)}, k=0 \quad (1)$$

Then, the relationship between values of A−M and correction values of k(A−M) is shown in the left side of TABLE 1, and the addresses of ROM 16 and the output data D=A−k(A−M) corresponding to each of the addresses are shown in the right side of TABLE 1.

TABLE 1

| value of A−M | correction value k(A−M) | address MA | output data D | address MA | output data D | ..... | address MA | output data D |
|---|---|---|---|---|---|---|---|---|
| 0 | 0 | 0000H | 00H | 0100H | 01H | ..... | FF00H | 00H |
| ±1 | ±1 | 0001H | 00H | 0101H | 01H | ..... | FF01H | 01H |
| ±2 | ±1 | 0002H | 01H | 0102H | 01H | ..... | FF02H | 02H |
| ±3 | ±2 | 0003H | 01H | 0103H | 02H | ..... | FF03H | 03H |
| ±4 | ±2 | 0004H | 02H | 0104H | 02H | ..... | FF04H | 04H |
| ±5 | ±3 | 0005H | 02H | 0105H | 03H | ..... | FF05H | 05H |
| ±6 | ±3 | 0006H | 03H | 0106H | 03H | ..... | FF06H | 06H |
| ±7 | ±3 | 0007H | 04H | 0107H | 04H | ..... | FF07H | 07H |
| ±8 | ±2 | 0008H | 06H | 0108H | 05H | ..... | FF08H | 08H |
| ±9 | ±1 | 0009H | 08H | 0109H | 07H | ..... | FF09H | 09H |
| ±10 | 0 | 000AH | 0AH | 010AH | 09H | ..... | FF0AH | 0AH |
| ±11 | 0 | 000BH | 0BH | 010BH | 0BH | ..... | FF0BH | 0BH |
| : | : | : | : | : | : | : | : | : |
| ±225 | 0 | 00FFH | FFH | 01FFH | FFH | ..... | FFFFH | FFH |

How to consult Table 1 will now be described briefly. Upper two columns of the address correspond to a value of an input data M. Lower two columns of the address correspond to an input data A. "H" at the end of the address signifies hexadecimal data indication. For example, in a case that the input data M=00H and another input data A=03H, the value A−M=3 and the correction value k(A−M)=2 at k=0.5. Since the output data D=A−k(A−M)=01H is stored in the corresponding address 0003H, the data 01H is outputted from ROM 16. Further, in another case that the input data M=00H and another input data A=09H, the value A−M=9 and the correction value k(A−M)=1 at k=0.1. The output data D=A−k(A−M)=0.8H stored in the corresponding address 0009H is outputted from ROM 16. Furthermore, in the other case that the input data M=00H and another input data A=0AH, the absolute value |A−M|>x=10 and then k=0 (low correlation). Accordingly, the correction value k(A−M) is also zero, and the output data D=A−k(A−M)=0AH stored in the corresponding address 000AH is outputted from ROM 16.

In the above embodiment, when $|A-M| \geq 10 = x$ stands, the image is considered as a moving image portion and k=0 is held so that the above equation (1) may become D=A and an output of A/D converter 7 without afterimage as it is may be delivered out of the ROM 16. When |A−M|<10 stands, the image is considered as a still image portion and $0 \leq k \leq 1$ stands. For example, for k=0.5, the above equation (1) becomes (A+M)/2, indicating that image data pieces having the correlation therebetween are averaged and an output in which noise components having no correlation therebetween are suppressed is delivered out of the ROM 16.

In the above mentioned embodiment using TABLE 1, the coefficient value k is varied in accordance with the absolute value |A−M| as follows. When the absolute value $|A-M| \leq 6$, coefficient k is set to 0.5. When $7 \leq |A-M| \leq 9$, coefficient k is gradually reduced lower than 0.5. When the absolute value |A−M| is changed from 9 to 10, the coefficient value k is so set that the correction value k(A−M) is not sharply changed.

Namely, when relative movement between the object 1 and the electronic endoscope is small and the difference between image data b and switched output data d is not greater than the predetermined value (in the case of a still image), output data c in which noise components are suppressed is produced from the ROM 16 and applied to the corresponding R signal memory 8, G signal memory 9 or B signal memory 10; but when relative movement between the object and the electronic endoscope is large and the difference between image data b and switched output data d exceeds the predetermined value (in the case of a moving image), output data c of the ROM 16 becomes image data b without afterimage and is applied to the corresponding R signal memory 8, G signal memory 9 or B signal memory 10.

The output data pieces e, f and g for R, G and B corrected as above and read out of the R, G and B signal memories 8, 9 and 10 simultaneously are converted by the D/A converters 11, 12 and 13, respectively, into analog image signals which in turn are synthesized by the color encoder 14 to provide on the monitor television 15 a display of an image in which noise is suppressed.

The values of x and k are in no way limited to those in the foregoing embodiment but may be set to predetermined values in accordance with the nature of the input signal. Further, as explained above the value of k may be set stepwise to different values within the range $0 \leq k \leq 1$ in accordance with the value of |A−M| so as to avoid a sharp change of the correction values k(A−M), and then smooth noise suppression is realized.

Generally, through the averaging processing utilizing correlation, noise can be suppressed but sharpness of an image is slightly degraded. More particularly, as the value of k becomes closer to 0.5, the noise suppression effect increases but the sharpness decreases. Conversely, as the value of k becomes closer to zero or one, the noise suppression effect is degraded but the sharpness does not decrease. Accordingly, a plurality of tables having mutually different values are provided in advance and a table from which an optimum image desired by the user can be obtained may be selected.

When the image signal has fairly high level (in brightness), observation is not affected largely even if a certain amount of noise is generated. That is, the noise is inconspicuous. Accordingly, in such a case, the noise suppression operation is cancelled (k=0) and a picked up signal as it is delivered without correction so that a sharp image may be obtained. An embodiment to this effect will now be described.

In the embodiment, the output is related to the address input in the look up table of the ROM 16 as follows:

$$D = A - k(A-M) = (1-k)A + kM \text{ for } |A-M| < x, \; 0 \leq k \leq 1 \text{ for } |A-M| \geq x,$$
$$k=0 \text{ where } 0 \leq k \leq 1, \; x \text{ is an arbitrary predetermined value}$$

, and for A≦Y (Y being an arbitrary predetermined value), k=0 is set.

An example of the data table having the relation as above is shown in FIG. 6. In the table of FIG. 6, k=0 stands at an input data of A≧16 (10H in terms of hexadecimal indication) and the output data is D=A. In other words, the input data as it is used without correcting the input data. In this example, for A≧16, the signal level is considered as a high image portion and k=0 is set to avoid the noise suppression processing, thus obtaining an image of high quality.

In the foregoing the data bit has been described as being 8 bits but obviously, the constituent bit number of the input can be changed to 8 bits and that of the output can be changed to 10 bits. Conversely, the present invention can obviously be applicable to the constituent bit number which is 8 bits or more or 8 bits or less.

Further, the ROM portion may include, for example, a high-speed SRAM in order that when the power supply is turned on, data can be supplied from a low-speed ROM.

The use of a low-speed ROM on time division base is included in the framework of the present invention.

As described above, according to the present invention, by adding only the memory such as the ROM constituting the look up table and the signal switching means such as the circuit changing switch, the electronic endoscope apparatus capable of suppressing noise without being accompanied by unnaturalness even during the occurrence of a moving image to produce images of high quality can be realized, thus contributing to reduction of size, reduction of consumptive power and improvement of reliability. Further, flexible measures such as easy attainment of free noise suppression characteristics can be ensured and such a merit as easy improvement of the performance in compliance with the nature of signals can be promoted.

We claim:

1. An electronic endoscope apparatus comprising:

illumination means for irradiating light of red, light of green and light of blue on an object for photographing in a predetermined order at a predetermined period;

image signal generation means for receiving reflection light from said object, generating a field sequential digital image signal for each color on the basis of the received reflection light and delivering the field sequential digital image;

first memory means for forming a predetermined look up table and responding to designation of an address input to deliver given data stored at a designated address on said look-up table;

red data memory means for storing data of a red image signal by one field or frame;

green data memory means for storing data of a green image signal by one field or frame;

blue data memory means for storing data of a blue image signal by one field or frame, wherein data of one field or frame from said first memory means is stored in one of said data memory means in synchronism with the order and the predetermined period of color illumination by said illumination means;

switching means for reading data from one of said data memory means in synchronism with the order and the period of color illumination by said illumination means and supplying the data as an addressing data to the address input of said first memory means, said first memory means being operable to receive as an addressing data the output of said image sginal generation means and the output of said switching means; and means for reading data pieces representative of the red, green and blue image signals from said data memory means for red, green and blue and synthesizing the data pieces to produce a color image signal;

wherein output data of said image signal generation means is A, output data of said switching means is M and data stored at an address designated by a set of A and M is D, said look-up table is set such that $$D=A-k(A-M)=(1-k)A+kM$$

for |A−M|<x, 0≦k≦1 for |A−M|≧x, k=0 where 0≦k≦1 and x is an arbitrary predetermined value.

2. An electronic endoscope apparatus according to claim 1, wherein said addressing data has lower addressing data in the form of output data of said image signal generation means and upper addressing data in the form of data from said data memory means for each color.

3. An electronic endoscope apparatus according to claim 1, wherein said look up table is also set such that for A≧Y (Y being an arbitrary predetermined value), k=0 stands.

4. An electronic endoscope apparatus according to claim 1 or 3, wherein the k in said look up table has a plurality of different values in accordance with the absolute value of A−M.

5. An electronic endoscope apparatus according to claim 1 or 3, wherein said first memory means has a plurality of look up tables having different coefficient values k (where k≠0), said look up tables being selectable desirably.

6. An electronic endoscope apparatus according to claim 1, wherein said image signal generation means has an imaging device for receiving reflection light from said object and converting the received light into an electric signal and an A/D converter for converting an output signal of said imaging device into a digital signal, and said means for synthesizing color image signals has D/A converters for converting the outputs of said data memory means for each color into analog signals.

* * * * *